United States Patent
Shenoy et al.

(10) Patent No.: US 7,164,658 B1
(45) Date of Patent: Jan. 16, 2007

(54) DISTRIBUTION OF DATA TRANSFER LOAD WHEN TRANSMITTING LAYER-3 DATAGRAMS ON A LAYER-2 NETWORK

(75) Inventors: Sudhakar Shenoy, Bangalore (IN); Amit S. Phadnis, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 894 days.

(21) Appl. No.: 09/975,944

(22) Filed: Oct. 15, 2001

(51) Int. Cl.
*H04L 12/28* (2006.01)

(52) U.S. Cl. .................. 370/254; 370/255; 709/223; 709/229

(58) Field of Classification Search .............. None
See application file for complete search history.

(56) References Cited

U.S. PATENT DOCUMENTS

| | | | | |
|---|---|---|---|---|
| 6,081,524 A * | 6/2000 | Chase et al. | ............... | 370/389 |
| 6,320,845 B1 * | 11/2001 | Davie | ............... | 370/230 |
| 6,577,653 B1 * | 6/2003 | Rochberger et al. | ........ | 370/536 |
| 6,711,167 B1 * | 3/2004 | Ikeda et al. | ............... | 370/395.1 |
| 6,757,281 B1 * | 6/2004 | Irish | ............... | 370/389 |
| 6,804,247 B1 * | 10/2004 | Sasyan et al. | ............... | 370/397 |
| 6,826,184 B1 * | 11/2004 | Bryenton et al. | ........ | 370/395.1 |

OTHER PUBLICATIONS

The ATM Forum Technical Committee; Entitled:"Inverse Multiplexing for ATM ( IMA ) Specification Version 1.1"; AF-PHY-0086.001;Mar. 1999; Available from www.atmforum; (185 Pages).

Sklower, et. al.; Entitled, "Request for Comments: 1990- The PPP Multilink Protocol (MP)"; Aug. 1996; Available from www.ietf.org; (24 Pages).

* cited by examiner

*Primary Examiner*—Doris H. To
*Assistant Examiner*—Robert W. Wilson
(74) *Attorney, Agent, or Firm*—Narendra Reddy Thappeta

(57) ABSTRACT

An edge router which associates multiple virtual circuits (e.g., PVCs) with an internet protocol (IP) route. The data transfer load on the IP route is distributed on the virtual circuits. As a result, high aggregate effective bandwidth can be provided between edge routers, potentially without having to use a correspondingly high bandwidth physical connections.

27 Claims, 5 Drawing Sheets

DISTRIBUTION OF DATA TRANSFER LOAD WHEN TRANSMITTING LAYER-3 DATAGRAMS ON A LAYER-2 NETWORK

BACKGROUND OF THE INVENTION

1. Field of the Invention

The present invention relates to telecommunication networks, and more specifically to a method and apparatus for distributing data transfer load on different paths of a layer-2 network (e.g., ATM) when transporting layer-3 (e.g., Internet Protocol) datagrams.

2. Related Art

Layer-2 networks are often used to transport layer-3 datagrams. In a typical configuration well known in the relevant arts, an edge router interfaces with user systems (e.g., personal computers) and an asynchronous transfer mode (ATM) network to provide data transfers between the two. Another edge router may be present on the other side which provides data transfers between the ATM network and addition systems (e.g., target systems representing servers) accessed by the user systems.

A virtual circuit is often provided on a physical path (of a layer-2 network) to enable data transfers between edge routers. Thus, an edge router encapsulates a layer-3 datagram (received from a user system) in multiple ATM cells (or layer-2 packets, in general) and transmits the cells to the other edge router on the virtual circuit. The other edge router may forward the received data to a target system again in the form of layer-3 datagram(s). The data transfer in the reverse direction may also be performed similarly.

A virtual circuit may be shared for transferring data related to many systems. In general, it is desirable to provide high bandwidths on virtual circuits such that the applications on end systems (and servers) are not impeded by bottlenecks (throughput and/or latency) in data transfers. At least to avoid such bottlenecks, it is often desirable to increase the data transfer capability between edge routers (or other end systems at which virtual circuits terminate).

In a known prior approach, a service provider may increase the bandwidth of the virtual circuit, for example, by employing faster underlying physical paths. Alternatively, the service provider may use a different path with higher bandwidth. Unfortunately such approaches increase the overall cost for implementing networks. In addition, the approaches typically lead to service disruption when increasing the bandwidth as the changes entail (re)configuration of edge routers and/or intermediate switches. Accordingly, such approaches may be undesirable at least in some environments.

In an alternative prior approach, multiple logical IP interfaces may be configured on each router, with each logical IP interface being assigned a single IP address. A virtual circuit may be provisioned between each pair of IP addresses, with one address on each edge router. As a result, two different IP (layer-3) routes would be deemed to be present between the two edge routers. The traffic load (IP datagrams) may be distributed among the different layer-3 routers. In other words, the load balancing is achieved at layer-3 level.

Due to such distribution, a high aggregate bandwidth may be available for data transfers between the edge routers. At the same time, additional costs to implement high bandwidth physical paths may be avoided. However, one problem with such an alternative approach is that the complexity of implementation may be enhanced due to the need to support multiple routes (routing table entries) resulting from the parallel IP routes between the edge routers.

Accordingly, what is needed is a method and apparatus which enables data transfer load to be distributed on several virtual circuits provisioned potentially on different virtual circuit paths.

SUMMARY OF THE INVENTION

An edge router in accordance with the present invention associates multiple layer-2 virtual circuits with a single layer-3 route. The virtual circuits may be provisioned on different physical paths of a layer-2 network. The edge router distributes the traffic load on the virtual circuits when transmitting the datagrams (destined on the layer-3 route).

As a result, a high aggregate data transfer capability may be provided for the layer-3 route without necessarily having to provide a correspondingly high bandwidth on a single underlying physical path (of the layer-2 network). In one embodiment, layer-3 corresponds to internet protocol (IP) and layer-2 corresponds to ATM such that IP datagrams are transferred on the ATM virtual circuits provisioned to another edge router.

In one implementation of an edge router, a forwarding block determines an IP route by accessing a forwarding table using a destination IP address. The forwarding table returns a route entry indicating an edge router at the next hop and an interface (on the edge router) on which the datagram is to be transmitted. A VC determination block then accesses a virtual circuit table to determine the specific one of the virtual circuits provisioned to the edge router at the next hop.

In an alterative implementation, a forwarding information base is implemented, which provides the most suited VPI/VCI when a lookup is performed based on the IP destination address. In an embodiment, the forwarding information base (FIB) is implemented in the form of a tree structure such that the tree needs to be traversed using a destination IP address as a key to determine the VPI/VCI.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

In accordance with the present invention, multiple layer-2 virtual circuits are associated with single layer-3 route, and the traffic load of the layer-3 route is distributed on the layer-2 virtual circuits. Thus, a high aggregate bandwidth may be available between two layer-3 devices at either end of a layer-3 route. In addition, the solutions may be implemented without adding any (or at least substantial) complexity to the layer-3 routing protocols.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
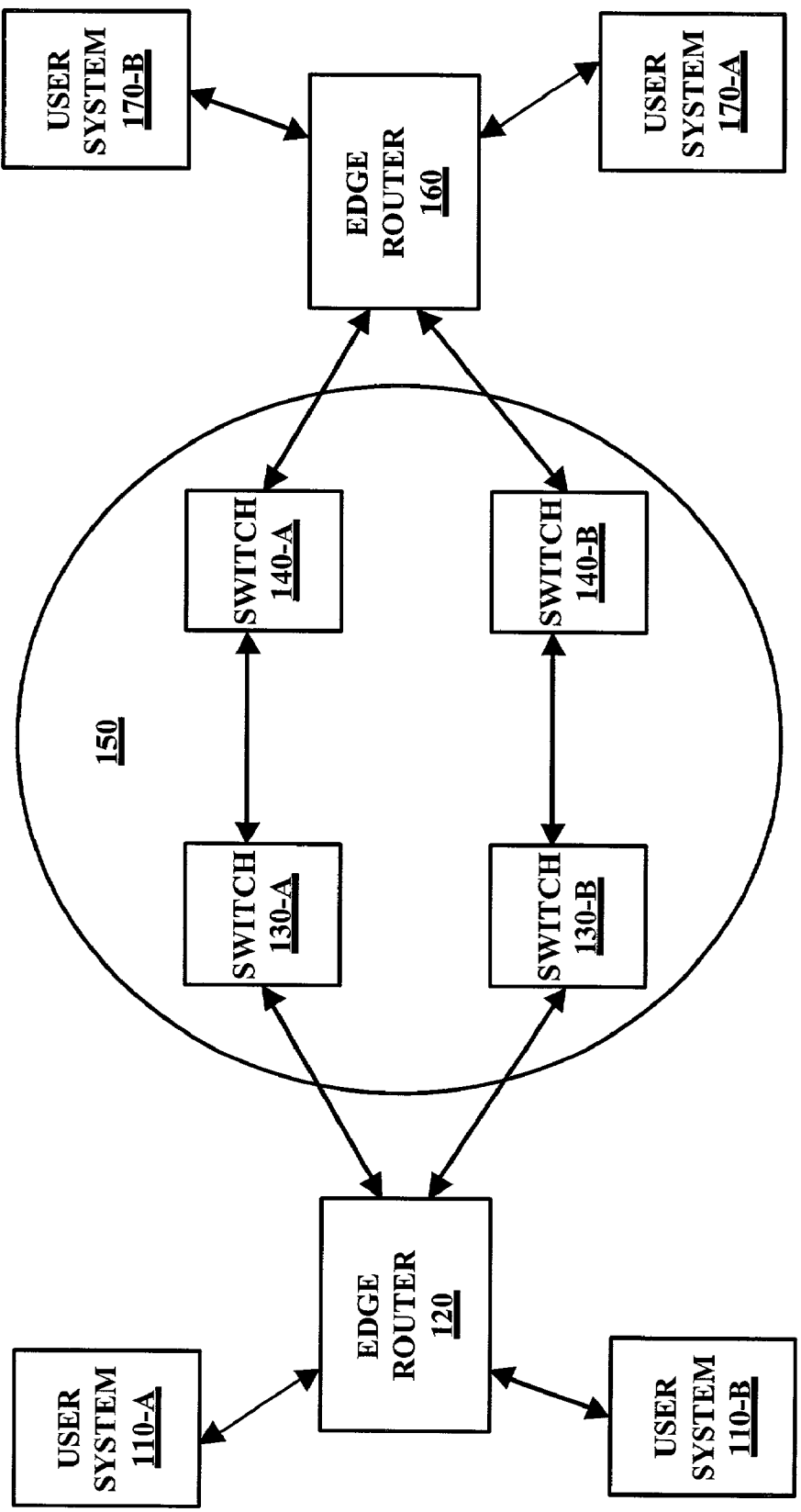
FIG. 1 is a block diagram illustrating an example environment in which the present invention can be implemented.

FIG. 1 is a block diagram illustrating an example environment in which the present invention can be implemented. The environment is shown containing user systems 110-A, 110-B, 170-A and 170-B, edge routers 120 and 160, and switches 130-A, 130-B, 140-A and 140-B. The switches are shown in ATM backbone 150. Each component is described below in further detail.

The environment is shown containing a few representative components only for illustration. In reality, each environment typically contains many more components. In addition, for conciseness and clarity, the invention is described with reference to edge router 120 only. However, several aspects are applicable to edge router 160 as well.

User systems 110-A, 110-B communicate with user (or target) systems 170-A and 170-B using ATM backbone 150. Each user system (e.g., 110-A) interfaces with the connected (e.g., user system 110-A is shown connected to edge router 120) edge router(s) using a layer 3 protocol such as Internet Protocol (IP). Each user system may correspond to a computer system or workstation, and can be implemented in a known way.

ATM backbone 150 is shown containing switches 130-A, 130-B, 140-A and 140-B, which provide different physical paths between edge routers 120 and 160. The switches operate consistent with the ATM protocol, and may be implemented in a known way. In general, switches enables edge routers 120 and 160 to communicate with each other using ATM protocol.

It should be understood that ATM is example of a layer-2 protocol and the present invention can be implemented using other packet-based layer-2 protocols such as Frame Relay. Such other implementations are also contemplated to be within the scope and spirit of the present invention.

Edge router 120 interfaces with user systems 110-A and 110-B using IP protocol (an example of a layer-3 protocol), and with switch 130-A and 130-B using ATM (layer-2 protocol). In accordance with the present invention, edge router 120 may use several layer-2 virtual circuits to communicate on a single IP (layer-3) route to edge router 160, and balance the traffic load across the virtual circuits. The manner in which such a benefit may be attained is described below with examples.

3. Method

Figure 2:
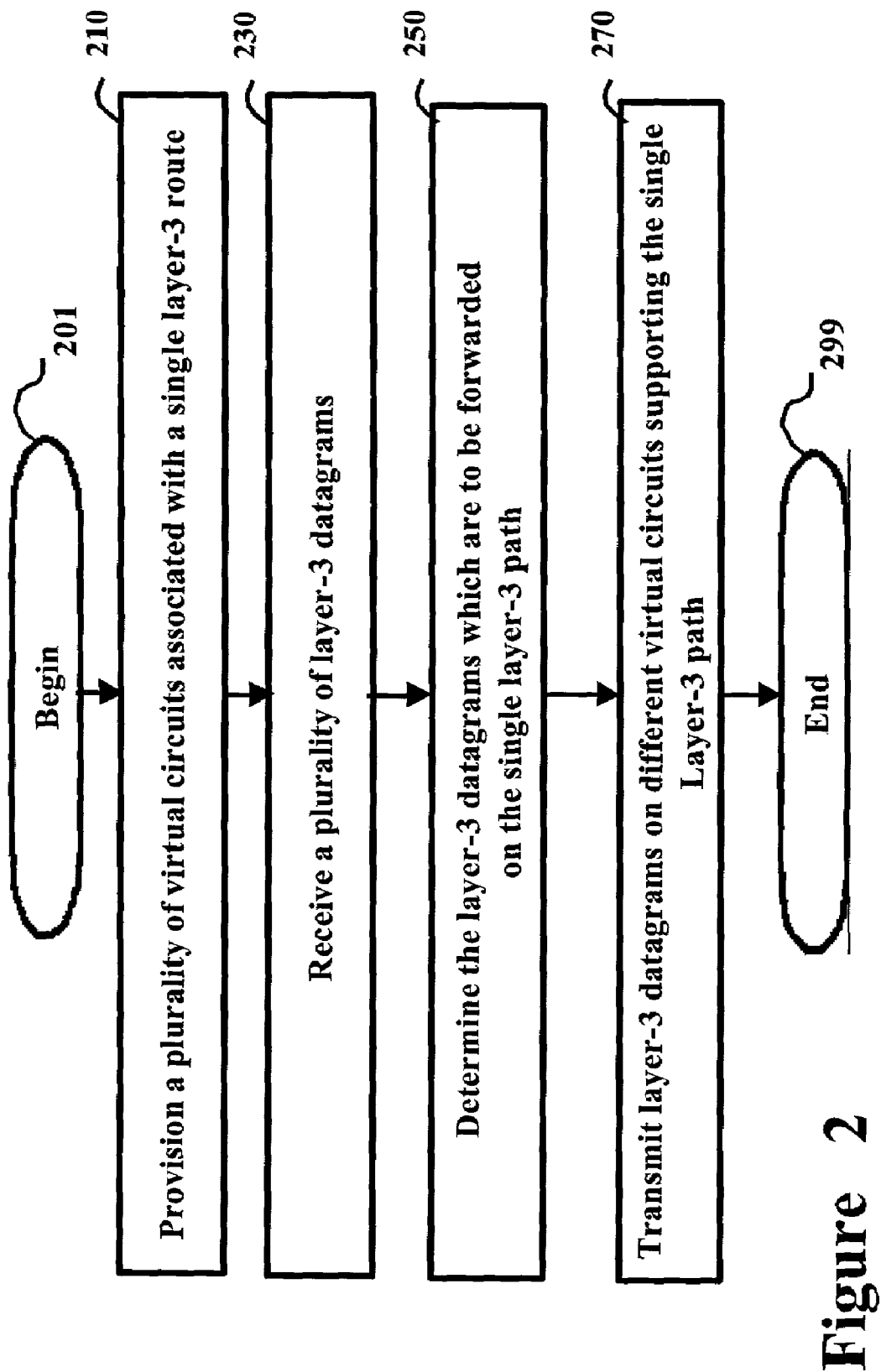
FIG. 2 is a flow chart illustrating a method according to an aspect of the present invention.

FIG. 2 is a flow-chart illustrating a method in accordance with the present invention. The method is described with reference to FIG. 1 for illustration only. However, the method can be implemented in other embodiments also, and such implementations are contemplated to be within the scope and spirit of the present invention. The method starts in step 201, in which control immediately passes to step 210.

In step 210, a plurality of virtual circuits (e.g., PVCs) are provisioned associated with a single layer-3 route. Thus, with reference to FIG. 1, a first virtual circuit may be provisioned on a path formed by switches 130-A and 140-A, and a second virtual circuit may be provisioned on a path formed by switches 130-B and 140-B. The two virtual circuits may be associated with an IP route between the two edge routers 120 and 160.

In step 230, a plurality of layer 3 (IP) datagrams are received in edge router 120, typically from end systems 110-A and 110-B. In step 250, edge router 120 determines the specific (subset of) layer-3 datagrams which need to be forwarded on the layer-3 route (noted in step 210). The determination is generally based on examination of the destination IP address contained in the header of each IP datagram, and may be implemented in a known way.

In step 270, the traffic load from edge router 120 to edge router 160 is distributed on the plurality of virtual circuits associated with the layer-3 route. Load distribution generally entails assigning each datagram to one of the virtual circuits, and transmitting the datagram on the assigned virtual circuit in the form of packets suitable for transmission on the layer-2 network.

Several approaches can be employed in assigning datagrams to the individual virtual circuits. It may be preferable to assign datagrams related to the same flow (typically unique combination of source/destination addresses/ports) to the same virtual circuit. For example, all datagrams with the same destination address may be assigned to the same virtual circuit.

Thus, some of the datagrams may be sent on the first virtual circuit and the remaining datagrams may be sent on the second virtual circuit. In an embodiment, the first and second virtual circuits may be associated with other IP routes also as a designer may wish. Thus, the present invention may be used to distribute the traffic load on a single IP route using multiple associated virtual circuits.

While the embodiments are described with reference to using only a single layer-3 router between edge routers 120 and 160, it should be understood that multiple parallel layer-3 routers may be present between the edge routers, with each layer-3 route being associated with a plurality of virtual circuits as described above. Such implementations are contemplated to be within the scope and spirit of the present invention. The description is continued with reference to an embodiment of edge router 120.

4. Edge Router

Figure 3A:
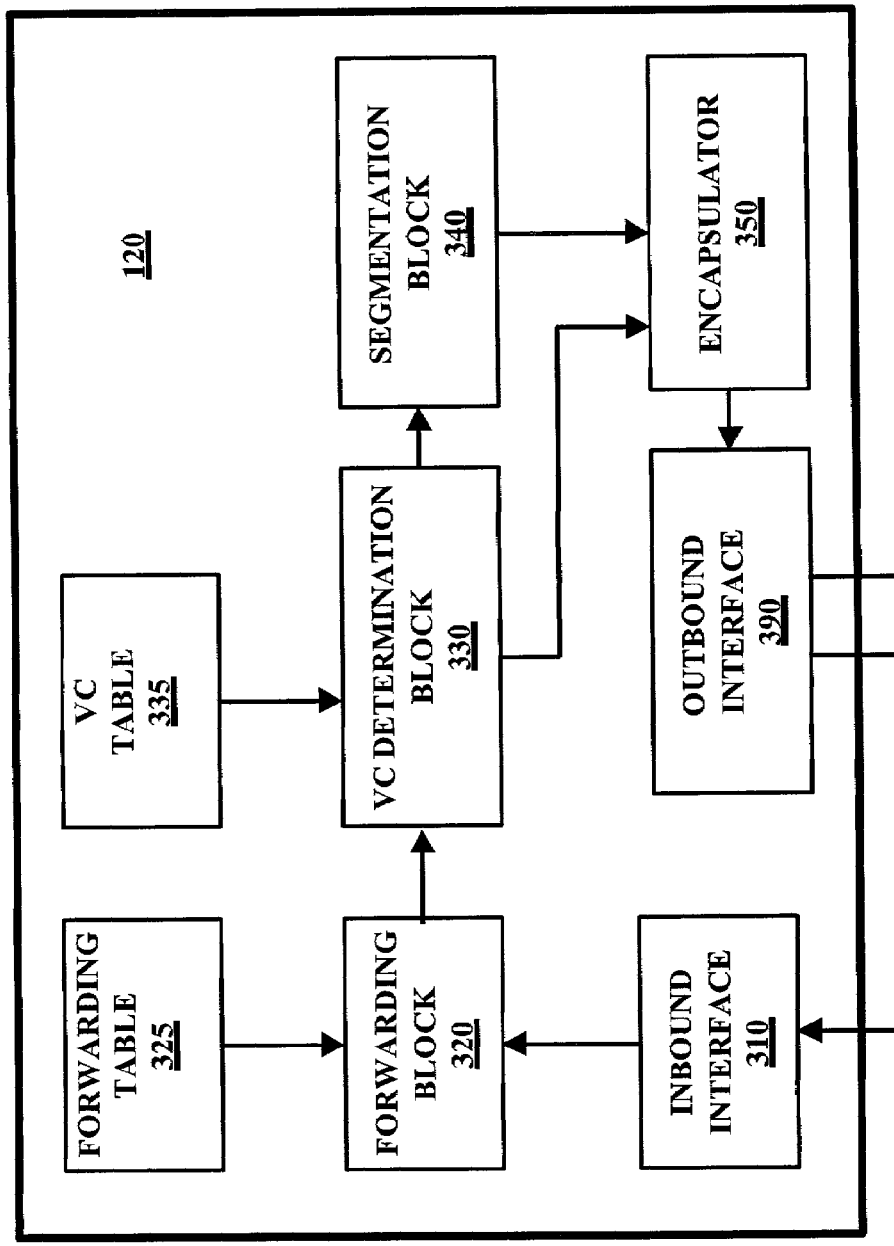
FIG. 3A is a block diagram illustrating the details of an embodiment of an edge router implemented according to an aspect of the present invention.

FIG. 3A is a block diagram illustrating the details of an embodiment of edge router 120 as relevant to several aspects of the present invention. Edge router 120 is shown containing inbound interface 310, forwarding block 320, VC (virtual circuit) determination block 330, segmentation block 340, encapsulator 350, and outbound interface 390. Each component is described below in further detail. For illustration, it will be assumed that two PVCs are provisioned on respective physical paths {switches 130-A and 130-B} and {switches 140-A and 140-B} between edge routers 120 and 160.

Inbound interface 310 provides the physical, electrical and other protocol interfaces to receive layer-3 (IP) datagrams from user systems 110-A and 110-B. Similarly, outbound interface 390 provides the physical, electrical and protocol interfaces to transmit ATM cells on the two PVCs between edge routers 120 and 160. Inbound interface 310 and outbound interface 390 may be implemented in a known way.

Forwarding block 320 receives an IP datagram from inbound interface 310, and determines an IP route the datagram is to be forwarded on. In an embodiment, the destination IP address is compared against entries in forwarding table 325 to retrieve a route entry. The route entry may contain an outbound interface and an IP address of (an interface of) a device (i.e., edge router 160) at the next hop. Forwarding table 325 may be populated using routing protocols and/or manually in a known way.

VC determination block 330 determines the specific one of the virtual circuits to use in forwarding a layer-3 datagram. As the datagrams to edge router 160 can be transmitted on any one of the two PVCs, VC determination block 330 needs to determine the specific one of the PVCs to use for transmitting each datagram. In an embodiment, the IP address of the edge router is used as an index to retrieve the circuit identifiers (VPI/VCI) of the associated PVCs. One of the two PVCs is then selected for each datagram.

Various approaches and considerations can be used in balancing the traffic load on the two PVCs. It may be desirable to allow the same application flow on the same PVC such that the user systems need not re-sequence the received data. Accordingly, the datagrams related to the same destination IP address may be mapped to the same virtual circuit. In the alternative, additional fields such as port numbers may also be examined to map a flow to the same PVC.

Segmentation block 340 segments each IP datagram into several ATM payload, and may be implemented in a known way. Encapsulator 350 receives each payload and encapsulates the payload into a corresponding ATM cell. The header for each cell is constructed based on a VPI/VCI received from VC determination block 330. The same VPI/VCI is used to encapsulate all cells of a datagram. Due to the encapsulation, the cells of each datagram are transmitted on a PVC determined by VC determination block 330. The cells are passed to outbound interface 390 for transmission on the corresponding port.

From the above, it may be appreciated that edge router 120 distributes the traffic load among several virtual circuits by associating the virtual circuits to a single IP route. Edge router 160 receives the sequence of cells carrying each datagram, and re-constructs the datagram from the cells in a known way. Datagrams may be transmitted in the reverse direction also similarly.

One disadvantage with the embodiment of FIG. 3A is that the IP route lookup and the VC lookup are implemented as two separate actions, and the throughput performance of edge router 120 may be impeded. The two actions may be combined, for example, as described below with reference to an alternative embodiment of edge router 120.

5. Alternative Embodiment

Figure 3B:
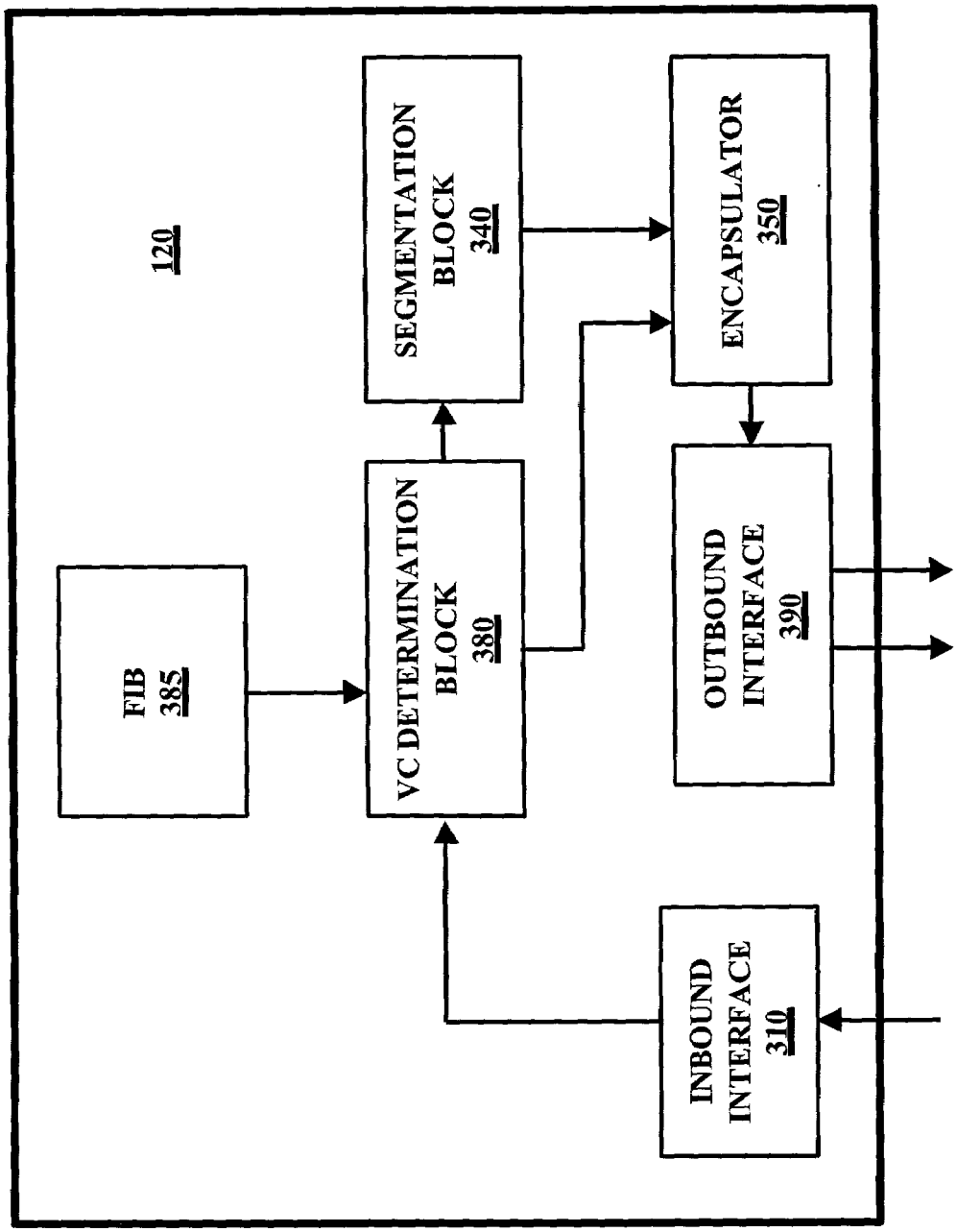
FIG. 3B is a block diagram the details of an alternative embodiment of an edge router implemented according to an aspect of the present invention.

FIG. 3B is a block diagram illustrating the details of edge router 120 in an alternative embodiment. Only the difference relative to FIG. 3A are described for conciseness. Forwarding block 320 and forwarding table 325 are absent in FIG. 3B. In addition, VC determination block 380 and forwarding information base (FIB) 385 respectively replace VC determination block 330 and VC table 335.

As described below, VC determination block 380 may efficiently determine the specific virtual circuit on which to send a datagram by examining FIB 385. The operation of VC determination block 380 can be appreciated by understanding the information present in FIB 385. Accordingly, FIB 385 is described first below.

FIB 385 may be implemented to efficiently map layer-3 information to a layer-2 information directly using a single search/lookup such that the mapping time is minimized. The IP route associated with each destination IP address (e.g., using network address and sub-net mask) may be determined a priori, and one of the associated virtual circuits is selected to transmit the datagrams with the destination IP address. In one implementation, only one virtual circuit is associated with each destination IP address in order to quickly process the datagrams.

Thus, in operation, FIB 385 needs to be examined quickly to determine the layer-2 virtual circuit. In an embodiment, FIB 385 is implemented consistent with Cisco Express Forwarding (CEF) Protocol, which is described in a document entitled, "Cisco Express Forwarding" available from Cisco Systems, Inc. (the intended assignee of the present application) and also on the world-wide web at URL:http://www.cisco.com/univercd/cc/td/doc/product/software/ios112/ios112p/gsr/cef.htm, and is incorporated in its entirety herewith. An M-trie structure, well known in the relevant arts, can be used to implemented FIB 385, with the leaves providing the layer-2 header information.

Thus, VC determination block 380 uses a destination IP address (of a received datagram) and traverses the tree of FIB 385 to determine the VPI/VCI to be used for transmitting the datagram. The VPI/VCI information is passed to encapsulator 350. Encapsulator 350 encapsulates the payload segments provided by segmentation block 340 using the VPI/VCI (and other header information) provided by VC determination block 380. The resulting cells are transmitted using outbound interface 390.

Accordingly, the embodiment(s) of FIG. 3B can also be used to transmit layer-3 datagrams on multiple virtual circuits. It should be understood that each feature of the present invention can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing edge router 120 with a desired mix of hardware, software and/or firmware. An embodiment implemented substantially in software is described below.

6. Software Implementation

Figure 4:
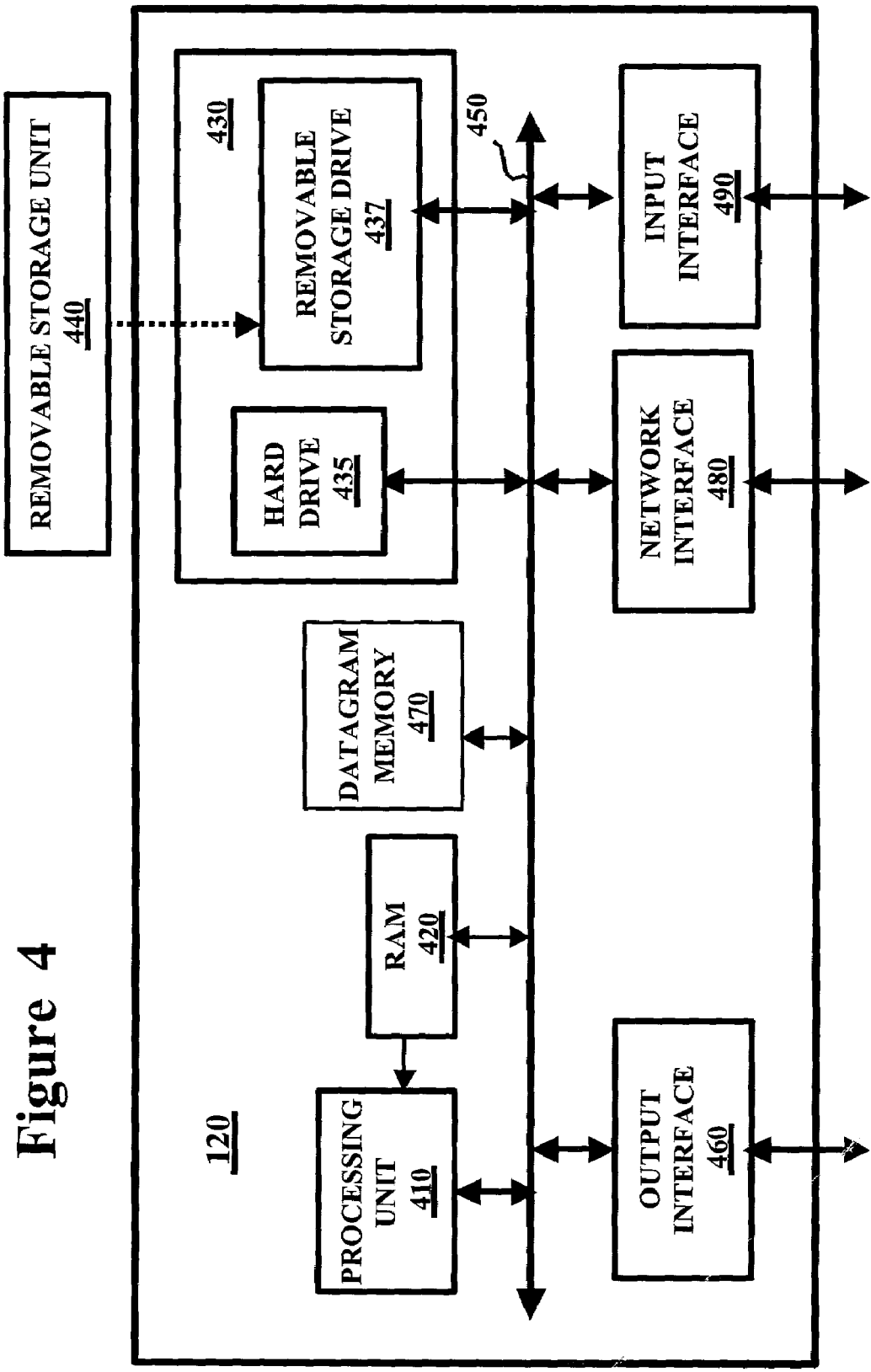
FIG. 4 is a block diagram illustrating the details of an embodiment of a device implemented substantially in the form of software according to an aspect of the present invention.

FIG. 4 is a block diagram illustrating the details of edge router 120 in one embodiment. Edge router 120 is shown containing processing unit 410, random access memory (RAM) 420, storage 430, output interface 460, datagram memory 470, network interface 480 and input interface 490. Each component is described in further detail below.

Output interface 460 provides output signals (e.g., display signals to a display unit, not shown) which can form the basis for a suitable user interface for an administrator to interact with edge router 120. Input interface 490 (e.g., interface with a key-board and/or mouse, not shown)

enables an administrator to provide any necessary inputs to edge router 120. Output interface 460 and input interface 490 can be used, for example, to enable a network administrator to specify the specific PVCs to be associated with a layer-3 route.

Network interface 480 enables edge router 120 to send and receive data on communication networks using asynchronous transfer mode (ATM) and layer-3 protocols (e.g., IP, DECnet, and, Vines protocol well known in the relevant arts) edge router 120 may be using. Network interface 480, output interface 460 and input interface 490 can be implemented in a known way.

RAM 420, storage 430, and datagram memory 470 may together be referred to as a memory. RAM 420 receives instructions and data on path 450 from storage 430, and provides the instructions to processing unit 410 for execution. In addition, RAM 420 may be used to implement the tables and data structures described above with reference to FIGS. 3A and 3B.

Datagram memory 470 stores (queues) cells/datagrams received and/or waiting to be forwarded (or otherwise processed) on different ports. Such memories can be employed in the embodiments of FIGS. 3A and 3B as well when buffering is required. Storage 430 may contain units such as hard drive 435 and removable storage drive 437. Storage 430 may store the software instructions and data, which enable edge router 120 to provide several features in accordance with the present invention.

Some or all of the data and instructions may be provided on removable storage unit 440, and the data and instructions may be read and provided by removable storage drive 437 to processing unit 410 via RAM 420. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420. In general processing unit 410 reads sequences of instructions from various types of memory medium (including RAM 420, storage 430 and removable storage unit 440), and executes the instructions to provide various features of the present invention.

Embodiments according to FIG. 4 can be used to implement the approaches described above with reference to FIGS. 3A and 3B. Some considerations in software implementations are described below.

7. Considerations in Software Implementations

The approach of FIG. 3A (in which an IP destination address is first mapped to an IP route and then the specific VC transmitting the datagram is determined for the route) may be implemented substantially in software in the embodiment of FIG. 4. In such an embodiment, an interrupt may be generated when each IP datagram is received.

Processing unit 410 may receive the datagram and place the datagram in datagram memory 470. Further processing of the datagram may need to be implemented in the form of processes (as opposed to interrupt handlers) under the control of a scheduler. As is well known, interrupt handlers generally receive a pre-emptive priority over scheduler controlled processes. Thus, for quick processing of datagrams, it is generally desirable that the datagrams be handled by interrupt handlers.

As the approach of FIG. 3A requires multiple look-ups, it may be undesirable to implement the processing of IP datagrams in interrupt handlers. Accordingly, the embodiment of FIG. 3A may not scale to environments requiring quick processing of a large number of datagrams.

An alternative embodiment of FIG. 4 may implement the approach of FIG. 3B in which the determination of an ATM header (including the VPI/VCI) can be performed quickly using the tree structures. As the lookup can be performed quickly, the datagrams may be processed in interrupt handlers, and the embodiments may scale to environments requiring quick processing of a large number of datagrams. The implementation of the logic in the form of interrupt handlers will be apparent to one skilled in the relevant arts by reading the disclosure provided herein.

Thus, the present invention can be used to implement edge routers which allow the traffic load on IP routes to be balanced on different virtual circuits. As the virtual circuits can be provisioned on different underlying physical paths, a high aggregate amount of bandwidth can be provided between edge routers without potentially not having to upgrade the bandwidth on the physical links.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of processing a plurality of layer-3 datagrams in a first edge router, said first edge router being connected to a second edge router by a layer-2 network, said method comprising:

provisioning in said first edge router a plurality of virtual circuits to said second edge router on said layer-2 network, said plurality of virtual circuits being associated with a layer-3 route;

receiving in said first edge router said plurality of layer-3 datagrams;

determining in said first edge router a subset of layer-3 datagrams, with each datagram in said subset of layer-3 datagrams having a corresponding layer-3 route equal to said layer-3 route, wherein said subset of layer-3 datagrams are comprised in said plurality of layer-3 datagrams;

encapsulating each of said subset of layer-3 datagrams in a corresponding plurality of layer-2 packets, all of the plurality of layer-2 packets corresponding to some of said subset of layer-3 datagrams being encapsulated for sending on a first one of said plurality of virtual circuits and all of the plurality of layer-2 packets corresponding to some other of said subset of layer-3 datagrams being encapsulated for transmission on another one of said plurality of virtual circuits; and sending said plurality of layer-2 packets related to said subset of layer-3 datagrams on said layer-2 network according to said encapsulating, wherein said determining comprises using a destination address comprised in each of said layer-3 datagrams to determine said corresponding layer-3 route, wherein said determining further determines whether to transmit each of said subset of layer-3 datagrams in either said first one of said plurality of virtual circuits or said another one of said plurality of virtual circuits, and wherein said encapsulating comprises using a header which identifies the determined virtual circuit for each layer-2 packet of the corresponding layer-3 datagram.

2. The method of claim 1, wherein said layer-2 network comprises a plurality of switches providing a plurality of physical paths between said first edge router and said second edge router, said first one of said plurality of virtual circuits being provided on a first one of said plurality of physical paths and said second one of said plurality of virtual circuits being provided on a second one of said plurality of physical paths.

3. The method of claim 1, further comprising selecting one of said plurality of virtual circuits for transmitting each of said subset of layer-3 datagrams, wherein said encapsulating is performed after said selecting.

4. The method of claim 3, wherein said determining comprises retrieving a route entry from a forwarding table using said destination address of a first IP datagram, wherein said route entry indicates whether said IP route is to be used to transport said first IP datagram, and wherein said selecting is performed based on said route entry.

5. The method of claim 4, wherein said determining is implemented in the form of a process under the control of a scheduler, wherein said process and said scheduler are implemented substantially in the form of software in said first edge router.

6. The method of claim 3, wherein said determining and selecting are implemented using a data structure, which when traversed using said destination address returns a layer-2 header corresponding to a virtual circuit on which a corresponding IP datagram is to be sent.

7. The method of claim 6, wherein said determining and said selecting are implemented in an interrupt handler and wherein said data structure comprises a tree.

8. The method of claim 1, wherein layer-3 comprises Internet Protocol (IP) such that layer-3 datagrams, layer-3 protocol, and layer-3 route respectively comprise IP datagrams, IP protocol, and IP route, and wherein said layer-2 comprises a synchronous transfer mode (ATM) such that said layer-2 packets comprise ATM cells.

9. A computer readable medium carrying one or more sequences of instructions for causing a first edge router to process a plurality of layer-3 datagrams in a first edge router, said first edge router being connected to a second edge router by a layer-2 network, wherein execution of said one or more sequences of instructions by one or more processors contained in said first edge router causes said one or more processors to perform the action of:

provisioning in said first edge router a plurality of virtual circuits to said second edge router on said layer-2 network, said plurality of virtual circuits being associated with a layer-3 route;

receiving in said first edge router said plurality of layer-3 datagrams;

determining in said first edge router a subset of layer-3 datagrams, with each datagram in said subset of layer-3 datagrams having a corresponding layer-3 route equal to said layer-3 route, wherein said subset of layer-3 datagrams are comprised in said plurality of layer-3 datagrams;

encapsulating each of said subset of layer-3 datagrams in a corresponding plurality of layer-2 packets, all of the plurality of layer-2 packets corresponding to some of said subset of layer-3 datagrams being encapsulated for sending on a first one of said plurality of virtual circuits and all of the plurality of layer-2 packets corresponding to some other of said subset of layer-3 datagrams being encapsulated for transmission on another one of said plurality of virtual circuits; and sending said plurality of layer-2 packets related to said subset of layer-3 datagrams on said layer-2 network according to said encapsulating, wherein said determining comprises using a destination address comprised in each of said layer-3 datagrams to determine said corresponding layer-3 route, wherein said determining further determines whether to transmit each of said subset of layer-3 datagrams in either said first one of said plurality of virtual circuits or said another one of said plurality of virtual circuits, and wherein said encapsulating comprises using a header which identifies the determined virtual circuit for each layer-2 packet of the corresponding layer-3 datagram.

10. The computer readable medium of claim 9, wherein said layer-2 network comprises a plurality of switches providing a plurality of physical paths between said first edge router and said second edge router, said first one of said plurality of virtual circuits being provided on a first one of said plurality of physical paths and said second one of said plurality of virtual circuits being provided on a second one of said plurality of physical paths.

11. The computer readable medium of claim 9, further comprising selecting one of said plurality of virtual circuits for transmitting each of said subset of layer-3 datagrams, wherein said encapsulating is performed after said selecting.

12. The computer readable medium of claim 11, wherein said determining comprises retrieving a route entry from a forwarding table using said destination address of a first IP datagram, wherein said route entry indicates whether said IP route is to be used to transport said first IP datagram, and wherein said selecting is performed based on said route entry.

13. The computer readable medium of claim 12, wherein said determining is implemented in the form of a process under the control of a scheduler, wherein said process and said scheduler are implemented substantially in the form of software in said first edge router.

14. The computer readable medium of claim 11, wherein said determining and selecting are implemented using a data structure, which when traversed using said destination address returns a layer-2 header corresponding to a virtual circuit on which a corresponding IP datagram is to be sent.

15. The computer readable medium of claim 14, wherein said determining and said selecting are implemented in an interrupt handler and wherein said data structure comprises a tree.

16. A first edge router for processing a plurality of layer-3 datagrams, said first edge router being connected to a second edge router by a layer-2 network, said first edge router comprising:

means for provisioning a plurality of virtual circuits to said second edge router on said layer-2 network, said plurality of virtual circuits being associated with a layer-3 route;

means for receiving in said first edge router said plurality of layer-3 datagrams;

means for determining in said first edge router a subset of layer-3 datagrams, with each datagram in said subset of layer-3 datagrams having a corresponding layer-3 route equal to said layer-3 route, wherein said subset of layer-3 datagrams are comprised in said plurality of layer-3 datagrams;

means for encapsulating each of said subset of layer-3 datagrams in a corresponding plurality of layer-2 packets, all of the plurality of layer-2 packets corresponding to some of said subset of layer-3 datagrams being encapsulated for sending on a first one of said plurality of virtual circuits and all of the plurality of layer-2 packets corresponding to some other of said subset of layer-3 datagrams being encapsulated for transmission on another one of said plurality of virtual circuits; and means for sending said plurality of layer-2 packets related to said subset of layer-3 datagrams on said layer-2 network according to said encapsulating, wherein said means for determining uses a destination address comprised in each of said layer-3 datagrams to determine said corresponding layer-3 route, wherein said means for determining further determines whether to transmit each of said subset of layer-3 datagrams in either said first one of said plurality of virtual circuits or said another one of said plurality of virtual circuits, and wherein said means for encapsulating uses a header which identifies the determined virtual circuit for each layer-2 packet of the corresponding layer-3 datagram.

17. The first edge router of claim 16, further comprising means for selecting one of said plurality of virtual circuits for transmitting each of said subset of layer-3 datagrams.

18. The first edge router of claim 17, wherein said means for determining retrieves a route entry from a forwarding table using said destination address of a first IP datagram, wherein said route entry indicates whether said IP route is to be used to transport said first IP datagram, and wherein said selecting is performed based on said route entry.

19. The first edge router of claim 17, wherein said means for determining and said means for selecting are implemented using a data structure, which when traversed using said destination address returns a layer-2 header corresponding to a virtual circuit on which a corresponding IP datagram is to be sent.

20. A first edge router for processing a plurality of layer-3 datagrams, said first edge router being connected to a second edge router by a layer-2 network, said first edge router comprising:

a memory storing data indicating that a plurality of virtual circuits are provisioned to said second edge router on said layer-2 network, said data further indicating that said plurality of virtual circuits are associated with a layer-3 route;

an inbound interface receiving said plurality of layer-3 datagrams, wherein a subset of layer-3 datagrams comprised in said plurality of layer-3 datagrams are to be transmitted on said layer-3 route;

a virtual circuit (VC) determination block determining to send some of said subset of layer-3 datagrams on a first one of said plurality of virtual circuits and some other of said subset of layer-3 datagrams on another one of said plurality of virtual circuits;

an outbound interface sending each of said subset of layer-3 datagrams on a determined one of said plurality of virtual circuits in the form of a plurality of layer-2 packets on said layer-2 network; and a forwarding block determining that said subset of layer-3 datagrams are to be transmitted on said layer-3 route based on a destination address contained in each of said plurality of layer-3 datagrams, wherein said VC determination block determines the specific virtual circuit on which to forward each of said subset of layer-3 datagrams after said forwarding block determines that said subset of layer-3 datagrams are to be transmitted on said layer-3 router.

21. The first edge router of claim 20, further comprising:

a segmentation block segmenting each of said subset of layer-3 datagrams into a plurality of payloads; and an encapsulator encapsulating said plurality of payloads in a corresponding plurality of layer-2 packets, wherein said plurality of layer-2 packets corresponding to each layer-3 datagram are encapsulated according to the determination of said VC determination block.

22. The first edge router of claim 21, wherein said layer-2 network comprises a plurality of switches providing a plurality of physical paths between said first edge router and said second edge router, said first one of said plurality of virtual circuits being provided on a first one of said plurality of physical paths and said second one of said plurality of virtual circuits being provided on a second one of said plurality of physical paths.

23. The first edge router of claim 21, further comprising:

a forwarding table containing a plurality of route entries, wherein said forwarding block retrieving a route entry from said forwarding table using said destination address of a first IP datagram, wherein said route entry indicates whether said IP route is to be used to transport said first IP datagram, and wherein said VC determination block selects either said first one of said plurality of virtual circuits of said another one of said plurality of virtual circuits based on said route entry.

24. The first edge router of claim 21, further comprising a data structure, which when traversed using said destination address returns a layer-2 header corresponding to a virtual circuit on which a corresponding IP datagram is to be sent.

25. The first edge router of claim 1, wherein layer-3 comprises Internet Protocol (IP) such that layer-3 datagrams, layer-3 protocol, and layer-3 route respectively comprise IP datagrams, IP protocol, and IP route.

26. The first edge router of claim 25, wherein each of said plurality of virtual circuits comprises a permanent virtual circuit (PVC).

27. The first edge router of claim 26, wherein datagrams related to the same flow are transmitted on the same virtual circuit such that an end system need not re-sequence the data in the received datagrams.

* * * * *

UNITED STATES PATENT AND TRADEMARK OFFICE
CERTIFICATE OF CORRECTION

PATENT NO. : 7,164,658 B1
APPLICATION NO. : 09/975944
DATED : January 16, 2007
INVENTOR(S) : Shenoy et al.

It is certified that error appears in the above-identified patent and that said Letters Patent is hereby corrected as shown below:

Col. 2, Line 32, replace "alterative" with --alternative--.

Col. 3, Line 50, replace "enables" with --enable--.

Col. 4, Line 4, replace "embodiments" with --environments--.

Col. 5, Line 62, replace "difference" with --differences--.

Col. 8, Line 14 replace "in the relevant" with --in relevant--.

Col. 12, Line 38 replace "circuits of said another" with --circuits or said another--.

Signed and Sealed this

Twentieth Day of March, 2007

JON W. DUDAS
*Director of the United States Patent and Trademark Office*